United States Patent
Jope et al.

[11] 3,712,780
[45] Jan. 23, 1973

[54] IMPROVED MOLDING APPARATUS FOR SIMULTANEOUSLY FORMING PLURAL ARTICLES

[75] Inventors: Bruce T. Jope, South Glastonbury, Conn.; Alan R. Phillips, Monson, Mass.

[73] Assignee: Monsanto Company, Saint Louis, Mo.

[22] Filed: Sept. 25, 1969

[21] Appl. No.: 860,862

[52] U.S. Cl. .................425/291, 249/120, 249/139, 264/153, 425/812, 425/472
[51] Int. Cl. ............................................B29c 17/14
[58] Field of Search ............29/401; 264/89, 153, 90; 18/39, 34; 249/139, 120, 126, 291; 425/472, 812

[56] References Cited

UNITED STATES PATENTS

| | | | |
|---|---|---|---|
| 3,342,573 | 9/1967 | Fredley | 264/89 |
| 3,359,354 | 12/1967 | Johnson | 264/89 |
| R26,413 | 6/1968 | Keyes | 264/89 |
| 3,400,111 | 9/1968 | Schwartz | 264/89 |
| 3,518,334 | 6/1970 | Carrigan | 264/89 |
| 1,457,991 | 6/1923 | Moore | 249/126 |
| 1,704,829 | 3/1929 | Grubman | 18/34 |
| 2,145,653 | 1/1939 | Hall et al. | 249/126 |
| 2,448,827 | 9/1948 | Reder | 249/120 |
| 2,797,442 | 7/1957 | Wagner | 249/126 |
| 2,909,805 | 10/1959 | James | 18/34 |
| 3,075,246 | 1/1963 | Stiller | 18/34 |
| 3,332,113 | 7/1967 | Fristot | 249/126 |
| 1,599,524 | 9/1926 | Hall et al. | 425/472 X |

FOREIGN PATENTS OR APPLICATIONS

| | | | |
|---|---|---|---|
| 495,716 | 11/1938 | Great Britain | 425/291 |

*Primary Examiner*—Charles W. Lanham
*Assistant Examiner*—Donald C. Reiley, III
*Attorney*—James C. Logomasini, Michael J. Murphy and Neal E. Willis

[57] ABSTRACT

An improved mold assembly for simultaneous thermoforming of plural articles from sheet material, wherein mold and/or cutting components are individually replaceable without dismantling major portions of the assembly. The individual molds are secured in the assembly through the article forming surfaces of the mold cavities, with the means for securing the molds, such as screws, having end faces which serve as portions of the forming surfaces of the molds. Depressions in these end faces form stacking lugs in the molded articles.

8 Claims, 5 Drawing Figures

INVENTORS.
BRUCE T. JOPE
ALAN R. PHILLIPS
BY
Michael J. Murphy
ATTORNEY

INVENTORS.
BRUCE T. JOPE
ALAN R. PHILLIPS
BY
ATTORNEY

IMPROVED MOLDING APPARATUS FOR SIMULTANEOUSLY FORMING PLURAL ARTICLES

BACKGROUND OF THE INVENTION

The present invention relates to simultaneous thermoforming of plural articles from plastic sheet, and more particularly to improved mold tooling for forming such articles.

As is well known, the trend in recent years in the highly competitive plastic packaging industry has been toward the mass production of single use, disposable thermoplastic containers by simultaneously thermoforming large numbers of such containters in a single cycle from the basic sheet stock. This is done by utilizing a very large number of molds mounted on a platen in a forming press, the molds having cavities into which portions of the sheet are pneumatically drawn to form depressions either with or without mechanical assistance. After trimming, these depressions represent the body portions of the finished containers. Techniques and machines for carrying out this type of sheet shaping are typically illustrated in U.S. Pat. Nos. 3,240,851 and Re. 26,413.

The equipment disclosed in U.S. Pat. No. Re. 26,413 symbolizes trim in place thermoforming wherein the articles are substantially severed from the basic sheet in the forming press by means of blades integrally mounted around the molds. These individual molds are usually secured on a die plate in the forming press by means of bolts introduced through the die plate into the back surfaces of the molds, i.e. through mold surfaces which never contact the sheet during forming, in order to avoid leaving an undesirable imprint on the surface of the finished article. The blades are usually secured around the molds by spacer bars interspersed between adjacent mold units of the assembly. An interference fit of the blades to the molds may be used, but the spacer bars prevent the blades from falling out of the assembly in the event of blade fracture. The die plate is then fastened around its periphery to a reciprocable base or platen in the forming press, and the entire assembly then constitutes the molding portion of the press.

After extended use, prudent operating procedure dictates the need to replace individual blades or molds of this mold assembly. With respect to the blade, this is necessary because of the wear occurring due to the manner of cutting against an opposing surface. Also, if the cutting plane of one blade in the multiple molding unit assembly is not quite identical with that of the others, it will wear much more rapidly. A blunt ended blade may not cut sufficiently through the sheet and thereby render peeling removal of the articles from the sheet difficult, whereas a deep trim may prevent conveying of the articles out of the press while retained in the sheet. A nicked cutting surface on the blade can cause uneven severing from the sheet and crushing as opposed to cutting of the plastic, which frequently results in the presence of undesirable whiskers or slivers along the outer edge of the article.

With respect to individual mold changes, this may be necessary for general cleaning purposes, or because of foreign material becoming trapped between the sheet and the mold causing damage to the molding surfaces. Also, the mold cavities usually have minute holes therein for varying the pressure in the cavity during forming which can become plugged with the plastic after repeated cycles.

To selectively remove individual components from the mold assembly when fabricated as described above, required initial removal of the rather heavy and bulky entire mold assembly from the forming press by releasing the die plate from the support platen. This was required in order to expose the ends of the bolts securing the individual molds to the die plate. A typical mold assembly in this type of operation could be as large as 4 feet by 4 feet and comprise 30 individual molding units weighing a total of about 1,000 pounds. The particular mold(s) or blades would then be removed from the die plate, and after installing replacement units the die plate would again be attached about its periphery to the movable platen, whereupon manufacture could again commence. Needless to say, the lost time and manpower required for this rather laborious change, materially affected the economics of the operation, which is of the type dependent for success on high volume, low cost production. Also, with this type of assembly, the heavy support plate with the molds attached intermediate its edges could be secured in the press only around its periphery due to the limitations of the construction. Since the assembly reaches elevated temperatures because of the necessary presence of sufficient heat in the process to soften the thermoplastic sheet, the support platen may incrementally expand and undesirably sag in its center area, whereat it is not secured to the support platen. No provisions can be made conveniently to correct this, however, because of the manner in which the assembly is constructed.

In addition, when the articles being formed are containers such as vending cups or packaging trays, they are desirably configured to permit stacking within each other for optimum utilization of space. In so doing, provisions must be made in the articles to keep them spaced from each other within the stack, in order that they do not jam into one another such that they will now easily separate by gravity. This, of course, can be a problem when utilizing such cups in coin operated vending machines, or trays in automated packaging lines employing destacking equipment. One form of stacking provision provided has been the formation of non-aligned depressions in the container surface, such that when one container is stacked within another it is supported on the depressions and therefore spaced from the adjoining container to the extent of the height of the depressions. Such containers are typically shown in copending U.S. Pat. Application Ser. No. 684,149, filed Nov. 20, 1967, and assigned to the assignee of the present invention. This then means that individual molds of the assembly must differ from each other to the extent of staggering the location of the depressions in the forming surfaces of adjacent molds, in order to provide the misaligned stacking lugs in the finished containers. Needless to say, this increases mold costs because of the specific provisions and attention required to make differing molds and to install them in the proper sequence in the mold assembly.

Now there has been discovered an improved thermoforming mold assembly which overcomes the aforementioned difficulties of the prior art.

Accordingly, it is a principal object of this invention to provide improved thermoforming mold tooling for use in a process for simultaneous forming of plural articles.

Another object of this invention is to reduce the down time of a high speed thermoforming line when replacing mold components of the forming press.

Another object of this invention is to provide an improved thermoforming mold assembly having a plurality of article molds wherein provisions are made to facilitate replacement of individual components without disturbing other parts of the assembly.

An additional object of this invention is to provide plural, identical molds for thermoforming containers of the type which are stackable within each other in spaced relationship by means of mis-aligned supporting lugs in consecutive containers.

A still further object of this invention is to provide means for fastening a plurality of molds to a support plate of a mold assembly which become part of the article forming surfaces of the molds when the molds are in place in the assembly.

Yet another object of this invention is to provide means for fastening a plurality of molds to a support plate of a mold assembly, which serves the additional function of forming stacking lugs in the articles when shaped in the molds.

Another object of this invention is to provide an improved method for changing individual molding units of a mold assembly made up of a large number of such units.

Other objects of this invention will in part be obvious and will in part appear hereinafter.

SUMMARY OF THE INVENTION

These and other objects are accomplished by providing an improved thermoforming mold assembly which comprises a support plate, a plurality of molds having a series of channels formed therein opening at one end into forming cavities in the molds and at the other end to the support plate, and means insertable through the channels in the molds for rigidly securing the molds to the support plate. The securing means have end faces adapted to become portions of the surface of the forming cavities of the molds when the molds are in place against the support plate, the end faces having shaped depressions formed therein for defining stacking lugs in articles formed in the molds. The mold assembly preferably is of the trim in place variety and includes a plurality of sealing and severing blades surrounding the molds, and means for associating the blades with the molds to prevent vertical movement of the blades with respect to the molds. The means for rigidly securing the molds to the support plate preferably includes a series of threaded channels in the support plate alignable with the channels in the molds, fasteners having threaded end portions which cooperate with the threads in the channels of the support plate, and annular discs rigidly positioned about the fasteners between their ends for cooperating with surfaces of the molds adjacent the support plate, whereby the mold may be pried away from the support plate while resting on the discs as the fasteners are rotated out of the channels of the support plate.

An improved method is provided for replacing components of a molding unit of such a mold assembly which includes a plurality of such units, the method comprising the steps of rotating a jackscrew outwardly through a forming cavity of a mold component of one of the molding units of the assembly to pry the mold component away from adjoining molding units and free it from the mold assembly, replacing one component of the molding unit with another identical component without disturbing the position of other molding units in the mold assembly, and rotating a jackscrew inwardly in the opposite direction from the first mentioned rotation to reposition the mold of the molding unit in the mold assembly.

BRIEF DESCRIPTION OF THE DRAWINGS

In describing the overall embodiments, reference will be made to the accompanying drawings in which.

DESCRIPTION OF THE PREFERRED EMBODIMENTS

Figure 1:
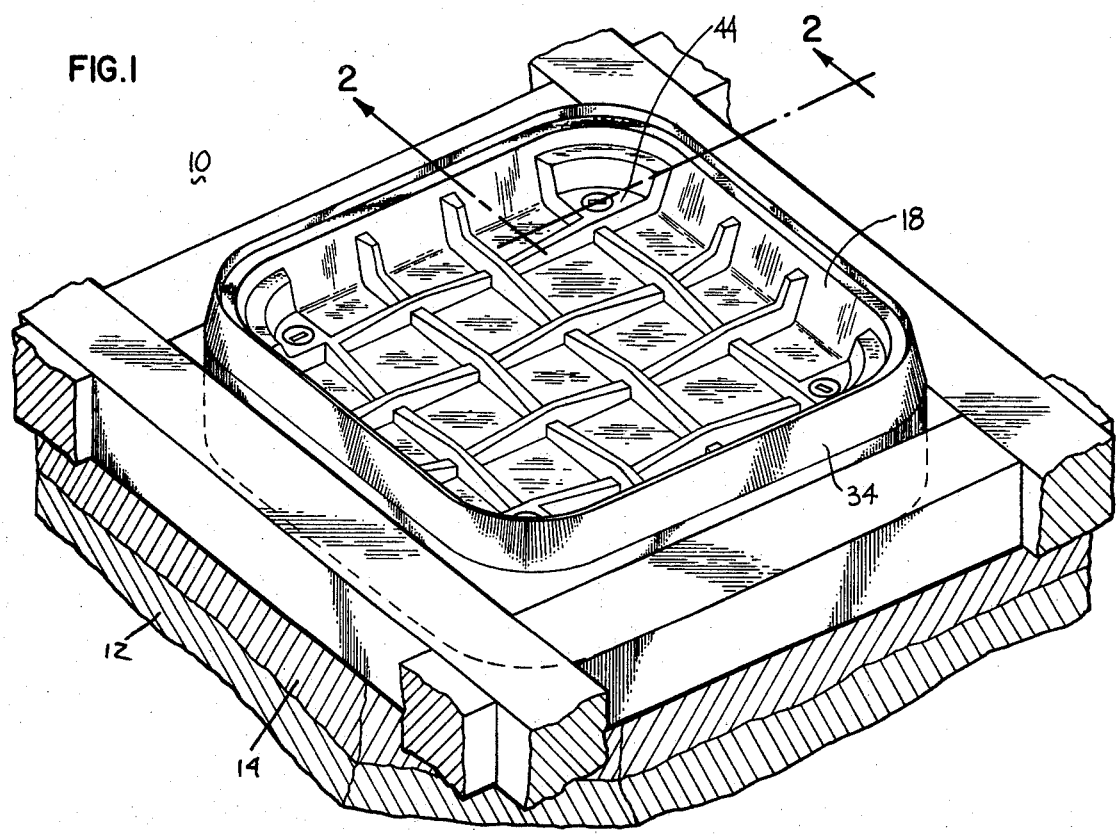
FIG. 1 is a partial perspective view of the apparatus of the present invention.
Figure 2:
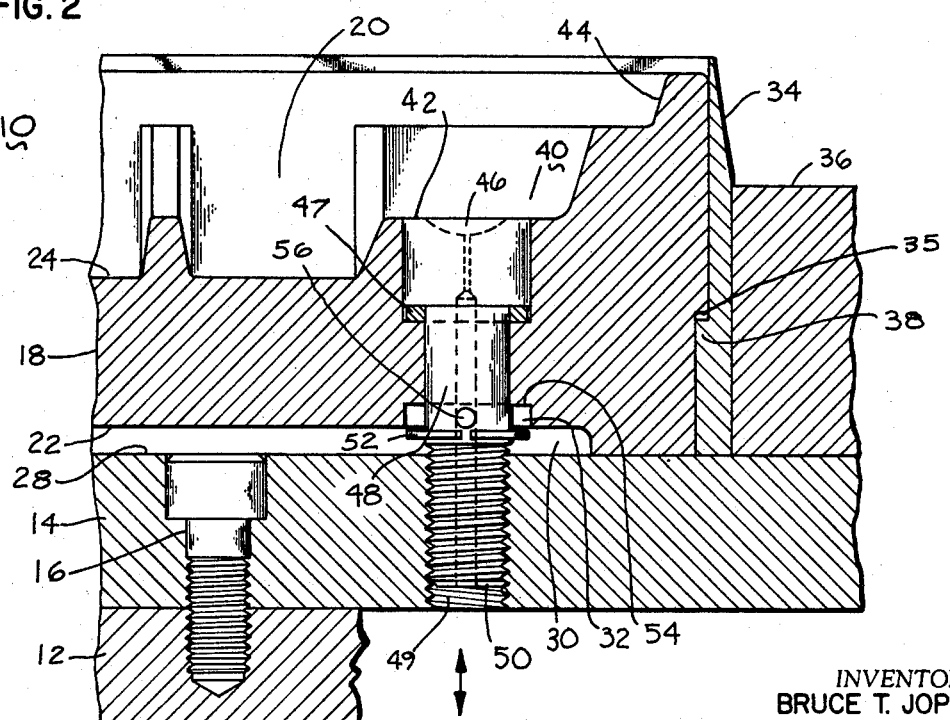
FIG. 2 is a sectional view taken along 2—2 of FIG. 1.

Referring now to the drawings, there is shown in FIG. 1, a portion of an improved, trim in place, thermoforming mold assembly, generally identified as 10. Through the preferred embodiment will be illustrated with respect to trim in place thermoforming, it should be realized that the concepts of the invention are applicable to other types of thermoforming, e.g. post trim thermoforming wherein the articles shaped in the forming press are severed from the sheet stock in a separate trimming operation downstream of the forming press. Assembly 10 comprises platen 12 (FIG. 2) reciprocably connected to a suitable actuating mechanism by a conventional linkage of a type well known to those skilled in the art. Support or die plate 14 of mold assembly 10 is rigidly secured to platen 12 by conventional means such as threaded set screws or bolts 16, applied as required through suitable passages across face 28 of plate 14. A plurality of identical molds, one of which is typically shown as 18 in the drawings, are provided for positioning in rows across the length and breadth of support plate 14. Support plate 14 may have a series of channels formed therein (not shown) which are connected to a reduced or increased source of pressure for varying the pressure in cavities 20 of molds 18 by means of minute holes extending between surface 22 and forming surface 24 of molds 18. These holes are on the order of 0.020 inch in diameter, the open area being sufficiently small such that no imprint is left in the plastic when forced against a molding surface of this type. Each mold 18 further has a series of channels formed therein, which in the case of the illustrated embodiment amounts to four, there being one in each of four corners of the generally rectangular forming cavity 20. These channels open at one end into forming cavity 20 and at the other end to surface 28 of support plate 14. The lower non molding portion of each mold may be hollow as generally indicated at 30 (FIG. 2). An annular recess 32 or enlargement of the channels extending between the forming cavity 20 and surface 28 may be provided in each mold adjacent hollow portion 30.

Figure 4:
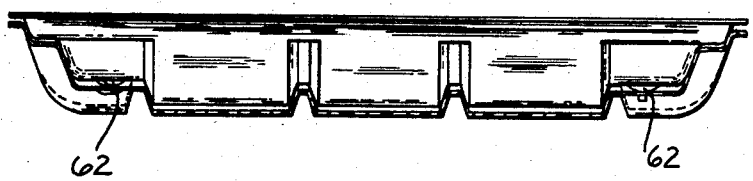
FIG. 4 is a partial, sectional view of a plurality of the articles of FIG. 3 stacked within each other.

Mold assembly 10 further comprises a plurality of sealing and severing blades 34, with each blade surrounding one mold 18 in the manner depicted in FIG. 2. Support bars 36 are positioned between adjoining blades 34, and are fastened by suitable conventional means to support plate 14. A molding unit, therefore, is herein considered to include a mold 18 and an integral, surrounding, sealing and severing blade 34. Means are provided for associating each blade 34 with a mold 18 in order to prevent vertical movement of the blades with respect to the molds. Such means may comprise a depression 35 in the periphery of the outer vertical surface of the mold and a mating lug or boss 38 on the blade designed to snugly seat in depression 35. Means 40, such as fillister head set screws, are adapted to be inserted through the channels in each mold 18 for rigidly securing molds 18 to support plate 14. These securing means have end faces 42 which become portions of the surfaces, generally indicated as 44, of the forming cavities of the molds when the molds are in place against support plate 14. Surfaces 44 represent the portions of the mold against which the sheet is drawn during formation of the containers. End faces 42 have shaped depressions 46 formed therein for defining stacking lugs in the articles formed in the molds. The depth of depressions 46 in a direction perpendicular to the direction of the forming cavities should be between 0.05 to 0.150 inch for best results in terms of drawing of the sheet there into. If the depression is less than 0.05 inch there is generally not sufficient space between adjacently nested containers (FIG. 4) to avoid jamming. With depths in excess of 0.150 inch, the plastic generally cannot be adequately drawn into the rather small cavity of the depression.

In the embodiment of FIG. 2 of the drawings, the means 40 for rigidly securing molds 18 to support plate 14 includes a series of threaded channels 49 in the support plate alignable with the channels in the molds, and fasteners 48 having threaded end portions 50 for cooperating with the threads in the channels of the support plate. Annular discs in the form of snap rings or washers 52 are rigidly positioned about the peripheries of fasteners 48 between the ends thereof, and necessarily situated above the portion of fastener 48 which extends into the threaded channel 49 in support plate 14 when the molds are in place. Discs 52 cooperate with planar surfaces 54 of annular recess 32 in order that the mold may be pried away from support plate 14 while resting on discs 52 as fasteners 48 are rotated out of channels 49 in support plate 14.

Each fastener 48 further has a vent passage 56 formed therein, extending from the surface of depression 46 to the exterior of the mold 18 in which it is installed, in order to permit egress of air therethrough from the depressions as the sheet is drawn in the mold to form the stacking lugs. Though these vent passages are preferred in order to obtain sharp definition of the portions of the sheet drawn into depressions 46 during forming, they may not be necessary for relatively shallow depressions. A suitable gasket 47 may be provided below the head of each fastener 48 to seal it in its channel in the mold.

When it is desired to replace either a blade 34 or mold 18 or both, a particular molding unit of mold assembly 18, each threaded fastener 48 of the mold 18 is rotated outwardly through forming cavity 20. This causes discs 52 which are rigidly mounted on fasteners 48 to move through recess 32 and against surface 54. Further rotation of fastener 48 will cause mold 18 to pry away from the adjoining mold units and therefore free it from the mold assembly. As can be appreciated, each threaded fastener 48 and peripheral disc 52 acts as a jackscrew during removal of a mold in this manner, with access being readily available through the exposed forming cavities 20 of the molds of the assembly. Boss 38 on blade 34 is arranged to confine blade 34 with respect to mold 18, yet does not hinder axial movement of a mold 18 with respect to a blade 34. After a mold 18 of a molding unit has been removed from the assembly through the opening defined by the periphery of its surrounding blade 34, either the mold itself or its then unconfined surrounding blade 34 may be replaced with another identical component without disturbing the position of the adjoining molding units. After this replacement, threaded fasteners 48 are then merely rotated inwardly through the channels in the molds whereupon another disc 52 is snapped around its periphery to replace the one previously used and then into the aligned cavities 49 of the support plate in the opposite direction from the initial rotation, in order to reposition the mold of the molding unit being worked on in its proper place back in the mold assembly. If a surrounding blade 34 has been removed, it is merely set back in place in the assembly prior to repositioning the mold 18. As can be appreciated, when molds 18 are assembled to support plate 14 in this manner the depressions 46 in the end faces 42 of fasteners 48, which fasteners are preferably fillister head set screws, should not be in exact alignment between adjacent molds in the mold assembly, so that the depressions forming the stacking lugs in the formed containers will consequently inherently be misaligned in consecutive articles.

Figure 3:
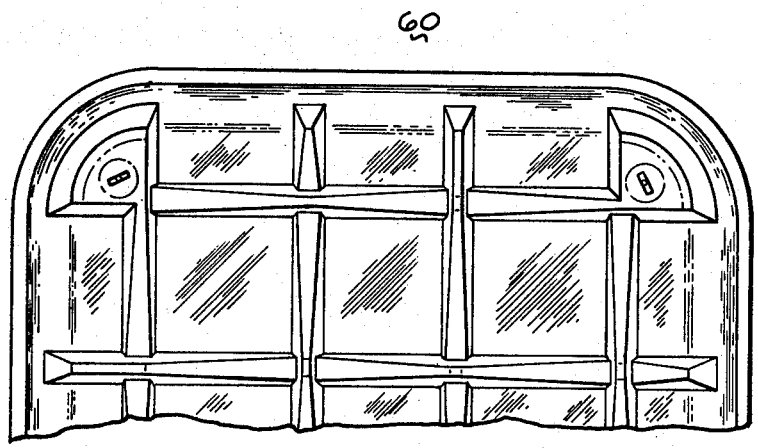
FIG. 3 is a partial, plan view of an article molded with the apparatus of FIG. 1.

One type of typical container formed with the apparatus of the present invention is the shallow, ribbed tray 60 of FIG. 3, having downwardly extending stacking lugs 62 formed in its surface, one in each of its four corner areas. When a plurality of containers 60 are stacked together (FIG. 4), one container rests within the next adjoining container in the stack on its stacking lugs 62, and is spaced therefrom to the extent of the vertical height of these consecutively misaligned lugs.

Figure 5:
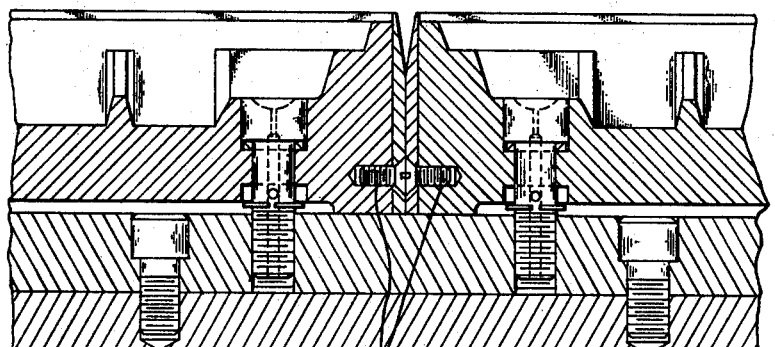
FIG. 5 is a view similar to FIG. 1 of an alternate embodiment of a portion of the apparatus of FIG. 1.

The embodiment of FIG. 5 depicts an alternative way for positioning a blade around a mold. In this embodiment, screws 58 comprise the means for associating each blade with a mold and extend through the thickness of the blades and into the molds through the exterior surface thereof. Otherwise the assembly is constructed identically to that depicted in FIG. 2. With the arrangement, spacer bars 36 are eliminated and sheet utilization is accordingly increased by reducing the space between adjacent mold units.

The manner of operation and the remaining components of the overall apparatus are described and depicted in the drawings of U.S. Pat. No. Re 26,413, issued June 25, 1968 and the disclosure thereof is incorporated herein by reference.

Although the invention has been described with a certain degree of particularity, it is understood that the present disclosure has been made only by way of example, and that numerous changes in the details of construction and combination and arrangement of parts may be resorted to without departing from the spirit and scope of the invention.

What is claimed is:

1. An improved thermoforming mold assembly comprising:
   a. a support plate;
   b. a plurality of molds, said molds having a series of channels formed therein opening at one end into forming cavities in the molds and at the other end to the support plate; and
   c. means insertable through the channels in the molds for rigidly securing the molds to the support plate, said means having end faces adapted to become portions of the surfaces of the forming cavities of the molds when the molds are rigidly secured against the support plate, said end faces having shaped depressions formed therein for defining stacking lugs in articles formed in said molds.

2. The assembly of claim 1 wherein the depth of the depressions in a direction perpendicular to the surface of the forming cavities is between 0.05 to 0.150 inch.

3. An improved, trim in place, thermoforming mold assembly comprising:
   a. a support plate;
   b. a plurality of molds having a series of channels formed therein opening at one end into forming cavities in the molds and at the other end to the support plate;
   c. a plurality of sealing and severing blades, surrounding said molds;
   d. means for associating said blades with said molds to prevent vertical movement of the blades with respect to the molds; and
   e. means insertable through the channels in the molds for rigidly securing the molds to the support plate, said securing means having end faces adapted to become portions of the surfaces of the forming cavities of the molds when the molds are rigidly secured against the support plate, said end faces having shaped depressions formed therein for defining stacking lugs in articles formed in said molds.

4. The assembly of claim 3 wherein the means for associating each blade with a mold comprises a depression in the mold and a boss on the blade for snugly seating in the depression.

5. The assembly of claim 3 wherein the means for rigidly securing the molds to the support plate includes a series of threaded channels in the support plate alignable with the channels in the molds and fasteners having threaded end portions for cooperating with the threads in the channels in the support plate.

6. The assembly of claim 3 wherein the means for associating each blade with a mold comprises a plurality of threaded fasteners extending through the thickness of the blades and into the molds.

7. The assembly of claim 5 including annular discs rigidly positioned about the peripheries of the fasteners between the ends thereof for cooperating with surfaces of the molds adjacent the support plate, whereby the mold may be pried away from the support plate while resting on the discs as the fasteners are removed from the channels in the support plate.

8. The assembly of claim 5 wherein the fasteners have vent passages formed therein extending from the surfaces of the depressions to the exterior of the molds for egress of air there through from the depressions as the stacking lugs are formed in the depressions.

* * * * *